3,081,274
FLUOROCARBON VINYL BENZENES AND THEIR POLYMERS
Richard F. Heine, White Bear Lake, Minn., assignor to Minnesota Mining and Manufacturing Company, St. Paul, Minn., a corporation of Delaware
No Drawing. Filed Nov. 7, 1960, Ser. No. 67,508
17 Claims. (Cl. 260—29.6)

This invention relates to a new and useful class or fluorinated vinyl benzenes and polymers thereof. In one aspect the invention relates to the sizing of fabrics to impart both repellency to water and resistance to absorption and soiling by oily and greasy materials, to the coating and impregnation of matrices such as paper and leather, and for other purposes.

The novel fluorocarbon vinyl benzenes of this invention are perfluoroalkanesulfonamidomethyl styrenes of the formula $R_fSO_2N(R)CH_2C_6H_4CH=CH_2$ wherein R is hydrogen or an alkyl group having from 1 to about 8 carbon atoms, preferably from 1 to 4 carbon atoms, $R_f$ is aliphatic $C_nF_{2n+1}$ or cycloaliphatic $C_nF_{2n-1}$, and $n$ is an integer from 1 to 18, preferably from 3 to 12. R may be a branched or straight chain alkyl group. Illustrative of these compounds are: perfluorooctanesulfonamido-methyl styrene, N-ethyl perfluorooctanesulfonamido-methyl styrene, N-hexyl perfluorooctanesulfonamido-methyl styrene, N-ethyl perfluorododecanesulfonamido-methyl styrene, N-isopropyl perfluorooctanesulfonamido-methyl styrene, N-ethyl perfluorocyclohexanesulfon-amidomethyl styrene, etc. The perfluoroalkane radical ($R_f$) may be cyclic as well as straight or branched chain.

These compounds are reactive monomers and can be polymerized to yield homopolymers as well as copolymers with another polymerizable ethylenically unsaturated monomer, such as the polymerizable vinyl compounds capable of vinyl addition reactions, particularly those which are reactive with styrene. Examples are acrylonitrile, styrene, methyl acrylate, methyl methacrylate, isoprene, maleic anhydride, vinylidene fluoride, halogenated butadienes, which compounds can include both halogenated and un-halogenated varieties. Fluorocarbon acrylates and the fluorinated monoolefins having from 2-3 carbon atoms are particularly preferred as comonomers. Vulcanizable copolymers can be made. Since the side chains can vary in length, the production of polymers having different physical properties is possible. Also high molecular weight elastomers and thermoplastics and furthermore lower molecular weight oils, greases and waxes may be prepared. The use of chain terminating agents to regulate molecular weight of polymers is known to the art.

The perfluoroalkanesulfonamidomethyl styrenes of this invention are prepared by reacting the sodium salt of a perfluoroalkanesulfonamide, e.g. as described in U.S. Patent No. 2,732,398, with ortho or para chloromethyl-2-chloroethyl benzene. The intermediate thus formed, i.e. perfluoroalkanesulfonamidomethyl-2-chloroethyl benzene, is dehydrochlorinated by a base (e.g. KOH, NaOH, etc.) in refluxing isopropanol to give the perfluoroalkanesulfonamidomethyl styrene. The preparations of these new compounds are illustrated by the following examples.

EXAMPLE 1

Sodium N-ethyl perfluoroctanesulfonamidate was prepared in methanol from refluxing equimolar amounts of sodium methoxide and N-ethyl perfluorooctanesulfonamide. Methanol was removed by heating the mixture to 100° C. for one hour under vacuum, and the product (28 parts by weight) was dissolved in 60 parts of acetone, and 9.5 parts of a mixture of ortho and para chloromethyl-2-chloroethyl benzene and 2 parts of sodium iodide were added. This mixture was refluxed for three hours, cooled and filtered. Evaporation of the acetone gave 12.5 parts of the solid intermediate, N-ethyl perfluorooctanesulfonami-domethyl-2-chloroethyl benzene, M.P. 61–63° C., which was recrystallized from methanol. Analysis indicated 33.2% C (33.6% C theoretical) and 5.57% Cl (5.23% Cl theoretical).

The above intermediate (20 parts) was mixed with 120 parts of isopropanol and 6 parts of potassium hydroxide. After refluxing with stirring for one-half hour, the mixture was filtered and the isopropanol was evaporated from the product. The N-ethyl perfluorooctanesulfonamidomethyl styrene, M.P. 95° C. (13.5 parts), was recrystallized from methanol. Analysis indicated 35.3% C (35.5% C theoretical) and a bromine number of 25.4 (34.9 theoretical). This compound was acetone soluble.

EXAMPLE 2

The procedure used in Example 1 was followed in the preparation of N-hexyl perfluorooctanesulfonamidomethyl styrene. In the dehydrochlorination step 17 parts of the styrene product was prepared from 30 parts of the intermediate. The N-hexyl perfluorooctanesulfonamidomethyl styrene had a melting point of 67–68° C. Analysis indicated 39.5% C (39.6% theoretical) and a bromine number of 22.7 (22.9 theoretical).

Similarly, other perfluoroalkanesulfonamides can be prepared as starting materials by reacting various perfluoroalkanesulfonyl fluorides which are disclosed in U.S. Patent 2,732,398, with diverse amines. Some of these perfluoroalkanesulfonamides, the sodium salts of which are employed in the procedure set forth hereinabove are. for example, N-methyl perfluorooctanesulfonamide. N-isopropyl perfluorooctanesulfonamide, N-ethyl perflu-orododecanesulfonamide, and perfluorodecanesulfona-mide.

An alternative method of preparation which avoids the necessity of the dehydrohalogenation step utilizes para-aminomethyl styrene, e.g. as described in U.S. 2,780,604, and its reaction with perfluoroalkanesulfonyl fluoride to produce the perfluoroalkanesulfonamidomethyl styrenes of this invention.

The effect of the fluorocarbon "tail," particularly when containing three or more perfluorinated carbon atoms, is to impart distinctive properties of oil and water repellency to the reaction products thereof. The ethylenic bond provides a point of attack for chemical reactions, and various derivatives may be made through addition at the double bond, e.g. addition of alcohols, bromine, chlorine, HCl, HBr, mercaptans, acetic acid, etc.

The present perfluoroalkanesulfonamideomethyl styrenes polymerize inter se to form novel homopolymers containing a multiplicity of units, each of which correspond to the following formula

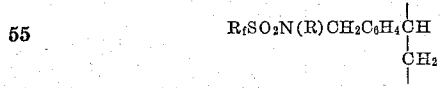

wherein $R_f$, and R are as earlier defined. Such polymers have a molecular structure comprising a skeletal linear hydrocarbon chain to which a multiplicity of saturated sulfonamidomethyl side chains are appended, each of which contains an —SO$_2$NR— radical separating a terminal perfluoroalkyl group and a bridging —CH$_2$C$_6$H$_4$— group. By varying the length of the perfluoroalkyl group, polymers with a wide range of useful properties can be obtained which are useful in many applications, e.g. adhesives, resins, rubbers, leather treatment, lubricants, flame resistant coatings, gaskets, polishes, impregnated or coated papers, treated textiles, etc.

Copolymers formed from mixtures of two or more different perfluoroalkanesulfonamidomethyl styrenes can be made in which case recurring units with different side chains are provided. Copolymers of perfluoroalkanesulfonamidomethyl styrenes and another polymerizable monomer or monomers can also be prepared, as mentioned earlier. Bulk, solution, emulsion and suspension polymerization techniques can be utilized, particularly with the use of free radical forming polymerization promoters and ionic polymerization promoters.

The perfluoroalkanesulfonamidomethyl styrene polymers of this invention are resistant to hydrolysis or loss of the perfluoroalkyl group, even when in contact with fatty oils at elevated temperatures. This is particularly important when such polymers come into contact with foodstuff, as is the case when they are used to treat packaging materials, and is in contrast to polymers which contain relatively easily hydrolyzable ester groups, such as vinyl ester groups. Various fabrics, synthetic and natural, as well as paper, leather and diverse other products, may be rendered both oil and water repellent with these polymers, using known techniques, e.g. spraying, roll coating, brushing, padding, dipping, etc.

The treatment of textile fabrics, for example, can be conducted so that the treated fabric has an imperceptible coating on the fibers which does not materially affect porosity, flexibility, feel and hand, strength, appearance or color. The sizing is tightly bonded to the fibers. The fabrics can be subjected to repeated launderings or dry cleanings without losing its water and oil resistance. This makes possible the production of fabrics which are resistant to absorption and staining not only by water and aqueous materials, but also by oily and greasy materials. Such materials are not absorbed and can be wiped off or readily removed by laundering or dry cleaning. This is particularly valuable with fabrics used in automobile upholstery, work clothes, sport clothes and suits, rugs and carpets, etc.

The properties of the polymer masses can also be varied by the use of plasticizers and solvents and by compounding with such materials as carbon black, silica, glass fibers, asbestos, colorants, dyes and other finely divided solid materials including powdered metals and metal oxides, e.g. aluminum powder and zinc oxide. The stiffness or hardness of the polymer mass can be increased by including a small proportion of a polyfunctional compound at the time of polymerization to cause crosslinking between the skeletal chains and thereby form a three-dimensional network. It is frequently desirable to blend other polymers, e.g. epoxides, phenolic resins, polyvinyl chloride, polytetrafluoroethylene, halogenated and unhalogenated butadiene and vinyl rubbers, polyesters, polymers of azirane ring containing compounds (e.g., trisaziridinyl phosphine oxide), etc. with the polymers of this invention. The use of various other expedients for modifying the properties of the polymers of this invention for a particular application will be understood by those skilled in the art and need not be further elaborated upon.

EXAMPLE 3

3.8 parts by weight of the monomer prepared in Example 1 (N-ethyl perfluorooctanesulfonamidomethyl styrene) were dissolved in 18 ml. of benzotrifluoride and 0.02 part of azobisisobutyronitrile was added. The solution was heated in an evacuated and sealed ampoule for 14 hours at 50° C. After evaporation of the solvent, 1.3 parts of a clear, brittle polymer insoluble in acetone was obtained, and films were cast from the benzotrifluoride solution.

A one percent solution of the polymer in benzotrifluoride was applied to kraft paper and provided oil resistance (8–9 minutes before SAE 10 oil penetrated). Textiles were also treated with this 1% solution, the excellent results in both oil and water repellency being reported in Table I.

The oil repellency test is based on the different penetrating properties of two hydrocarbon liquids, i.e. mineral oil ("Nujol") and n-heptane. Mixtures of these two liquids are miscible in all proportions and show penetrating properties proportioned to the n-heptane content of the mixture. The oil repellency numbers were selected to correspond to the AATCC standard spray ratings (AATCC 22–1952), which measure water repellency. The technique for measuring oil repellency is as follows:

Swatches (8 inch by 8 inch) of the treated fabric are placed on a flat table. Test mixtures of various concentrations of n-heptane and mineral oil are contained in small dropping bottles. A drop of each mixture is gently placed, not dropped, onto the fabric surface, preferably in two different portions of the test swatch. After the drops have been allowed to stand undisturbed for three minutes, the fabric appearance is observed through the oil drop. Penetration or wetting, as evidenced by darkening, is noted. The number of the mixture containing the highest proportion of n-heptane, which does not penetrate or wet the fabric after three minutes contact is called the oil repellency of the specimen. The division between failure or resistance of successive test mixtures is generally quite sharp, presenting little problem in determining the break point. The following test mixtures are employed, the higher rating being the more oil repellent.

| Oil Repellency Rating | Vol. percent Heptane | Vol. percent Mineral Oil |
|---|---|---|
| 100+ | 60 | 40 |
| 100 | 50 | 50 |
| 90 | 40 | 60 |
| 80 | 30 | 70 |
| 70 | 20 | 80 |
| 50 | 0 | 100 |
| 0 | | (1) |

[1] No holdout to mineral oil.

Table I

| Fabric | Oil Repellency | Spray |
|---|---|---|
| Wool gabardine | 100+ | 100 |
| 40/60 Dacron-wool blend | 80 | 100 |
| Wool flannel | 90 | 100 |

EXAMPLE 4

A solution of copolymer of N-ethyl perfluorooctanesulfonamidomethyl styrene and octadecyl methacrylate was prepared by charging an ampoule with the following recipe:

| | Parts by wt. |
|---|---|
| N-ethyl perfluorooctanesulfonamidomethyl styrene | 1.0 |
| Octadecyl methacrylate | 1.0 |
| Azobisisobutyronitrile | 0.002 |
| Benzotrifluoride | 2.0 |

The ampoule was sealed and tumbled at 50° C. overnight. Upon opening the ampoule, evaporation of solvent left a rather tacky, soft copolymer and some acetone soluble monomer (15 wt. percent of total). The following fabrics were treated by padding with a 1% solution of the copolymer in benzotrifluoride. After drying for 10 minutes at 100° C. the following tests were run.

| | Oil Repellency | Spray Rating |
|---|---|---|
| Flannel | 90 | 80 |
| Dacron-wool blend | 100 | 80 |

The scale for the oil repellency test extends from 0 to 100+ and the spray test scale runs from 0 to 100. Untreated wool flannel and Dacron-wool tropical fabric have 0 oil repellency ratings and 0–50 spray ratings. The application of the above 1% solution to kraft paper produced increased resistance to oil penetration.

EXAMPLE 5

This example illustrates the preparation of a three component copolymer using an emulsion technique.

The following formula was charged into an ampoule and tumbled in a 50° C. water bath overnight:

| | Parts by weight |
|---|---|
| N-hexyl perfluorooctanesulfonamidomethyl styrene | 40 |
| Octadecyl acrylate | 20 |
| Octadecyl methacrylate | 40 |
| Acetone | 54 |
| Water | 114 |
| 15% aqueous solution of "Brij 35" (a reaction product of ethylene oxide and $C_{11}H_{23}CH_2OH$, Atlas Company) | 16 |
| 2.5% aqueous solution of $K_2S_2O_8$ | 8 |

A stable copolymeric latex was formed. Upon recovery of the solids, a 78.8% yield of a tacky, slightly elastomeric copolymer insoluble in acetone was obtained.

Similar results were obtained by substituting N-ethyl perfluorooctanesulfonamidomethyl styrene for N-hexyl perfluorooctanesulfonamidomethyl styrene.

EXAMPLE 6

1.975 parts by weight of the monomer of Example 2 were dissolved in about 3 ml. of benzotrifluoride and 0.02 gram of azobisbutyronitrile was added. The solution was tumbled overnight in a 50° C. water bath. After the ampoule was opened and the solvent evaporated, a somewhat brittle homopolymer was recovered.

This polymer, in a 1% solution in benzotrifluoride, was applied to various fabric samples by dipping, squeezing and drying at 90° C. The repellency test results were as follows:

| | Oil Repellency | Spray Rating |
|---|---|---|
| Worsted flannel | 100+ | 70 |
| Dacron-wool tropical | 100+ | 70 |
| Wool gabardine | 100+ | 80 |
| Cotton jean cloth | 100 | 50 |

EXAMPLE 7

The following formula was charged to a polymerization ampoule and tumbled overnight in a 50° C. water bath:

| | Parts by weight |
|---|---|
| N-propyl-N-acrylyl perfluorooctanesulfonamide | 1.0 |
| N-hexyl perfluorooctanesulfonamidomethyl styrene | 1.0 |
| Benzotrifluoride | 3 |
| Azobisbutyronitrile | 0.02 |

A copolymeric latex having 26.3% solids was obtained. A brittle copolymeric film was produced upon evaporating the solvent.

Various other embodiments and modifications will become apparent to those skilled in the art without departing from the scope or spirit of this invention.

I claim:

1. A fluorinated vinyl benzene having the formula $R_fSO_2N(R)CH_2C_6H_4CH=CH_2$ wherein R is selected from the group consisting of hydrogen and an alkyl group having from 1 to about 8 carbon atoms, $R_f$ is selected from the group consisting of $C_nF_{2n+1}$ and cycloaliphatic $C_nF_{2n-1}$, and $n$ is an integer from 1 to 18.

2. Polymers having a skeletal chain containing recurring units of the formula

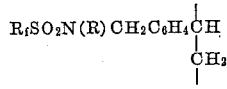

wherein R is selected from the group consisting of hydrogen and an alkyl group having from 1 to about 8 carbon atoms, $R_f$ is selected from the group consisting of $C_nF_{2n+1}$ and cycloaliphatic $C_nF_{2n-1}$, and $n$ is an integer from 1 to 18.

3. A stable aqueous dispersion of the polymer of claim 2.

4. A solution of the polymer of Claim 2 in benzotrifluoride.

5. A homopolymer of a perfluoroalkanesulfonamidomethyl styrene, said perfluoroalkane group having from 1 to about 18 carbon atoms.

6. A copolymer of a perfluoroalkanesulfonamidomethyl styrene, said perfluoroalkane group having from 1 to about 18 carbon atoms, and another polymerizable ethylenically unsaturated compound.

7. A copolymer of a perfluoroalkanesulfonamidomethyl styrene, said perfluoroalkane group having from 1 to about 18 carbon atoms, and another polymerizable vinyl compound.

8. The copolymer of Claim 7 in which the polymerizable vinyl compound is an acrylate ester.

9. Articles which have been coated with the polymers of claim 2.

10. Paper impregnated with the polymers of claim 2.

11. Textiles sized with the polymers of claim 2.

12. N-ethyl perfluorooctanesulfonamidomethyl styrene.

13. N-hexyl perfluorooctanesulfonamidomethyl styrene.

14. N-ethyl perfluorododecanesulfonamidomethyl styrene.

15. N-isopropyl perfluorooctanesulfonamidomethyl styrene.

16. N-ethyl perfluorocyclohexanesulfonamidomethyl styrene.

17. A fluorinated vinyl benzene having the formula $$R_fSO_2N(R)CH_2C_6H_4CH=CH_2$$

wherein R is selected from the group consisting of hydrogen and an alkyl group having from 1 to 4 carbon atoms, $R_f$ is selected from the group consisting of $C_nF_{2n+1}$ and cycloaliphatic $C_nF_{2n-1}$, and $n$ is an integer from 1 to 18.

References Cited in the file of this patent

FOREIGN PATENTS 818,756    Great Britain _____ Aug. 14, 1959